United States Patent [19]

Berman

[11] 3,832,668

[45] Aug. 27, 1974

[54] SILICON CARBIDE JUNCTION THERMISTOR

[75] Inventor: Herbert S. Berman, Pittsburgh, Pa.

[73] Assignee: Westinghouse Electric Corporation, Pittsburgh, Pa.

[22] Filed: Mar. 31, 1972

[21] Appl. No.: 239,968

[52] U.S. Cl. .......... 338/22 SD, 29/612, 73/362 SC, 338/30

[51] Int. Cl. .......... H01c 7/04

[58] Field of Search .......... 338/22 SD, 21, 30, 28; 317/235 Q, 235 N, 237; 73/362 SC; 29/612, 613

[56] References Cited

UNITED STATES PATENTS

| | | | |
|---|---|---|---|
| 2,505,936 | 5/1950 | Behn | 338/30 X |
| 2,818,482 | 12/1957 | Bennett | 338/30 |
| 2,961,625 | 11/1960 | Sion | 338/28 |
| 3,092,998 | 6/1963 | Barton | 317/235 Q |
| 3,175,177 | 3/1965 | Gaugler | 338/28 |
| 3,442,014 | 5/1969 | Lopacki | 317/235 AP |
| 3,458,779 | 7/1969 | Blank et al. | 317/237 X |
| 3,504,181 | 3/1970 | Chi Chang et al. | 317/237 X |
| 3,602,777 | 8/1971 | Berman | 317/237 X |

*Primary Examiner*—C. L. Albritton
*Attorney, Agent, or Firm*—C. L. Menzemer

[57] ABSTRACT

A high impedance, junction thermistor for sensing temperatures from about −200°C. to above 1,400°C. is provided with a semiconductor body of silicon carbide. The silicon carbide semiconductor body has at least first and second impurity regions forming a PN junction therebetween. The temperature is sensed by the impedance response across the PN junction.

2 Claims, 5 Drawing Figures

SILICON CARBIDE JUNCTION THERMISTOR

FIELD OF THE INVENTION

This invention relates to thermistors and particularly a thermistor for high temperature measurement.

BACKGROUND OF THE INVENTION

Silicon carbide semiconductor bodies have been used commercially to make diodes for use as high power rectifiers. Such diodes operate at temperatures up to about 500°C. and at radiation levels 10 times the radiation exposure that disable conventional silicon rectifiers. But semiconductor bodies of silicon carbide have not been known to have utility for any purpose above 500°C., or any use in sensing temperaturs over the extreme temperature range from about −200°C. to above 1,400°C.

Generally, thermistors are bulk resistors of semiconductor materials which have a high negative temperature coefficient of resistance. They are hard, ceramic-like semiconductors with electrical resistance that varies extensively with changes in temperature. Usually the bulk resistance of the thermistor decreases as the temperature rises and increases as the temperature falls. For example, the resistance of an ordinary thermistor at room temperature may decrease by almost 6 percent for each °C. rise in temperature. This characteristic is in direct contrast to the behavior of ordinary resistors which normally have a small positive temperature coefficient, increasing their resistance slightly as temperatures rise and decreasing as temperatures fall.

Thermistors have generally been manufactured in four distinct forms: beads, discs, washers and rods. All of these types are made by various mixtures of metal oxides and sulfides such as oxides or sulfides of manganese, nickel, cobalt, copper, uranium, iron, zinc, titanium and magnesium. The metal oxides and sulfides are mixed in various proportion to provide the required specific resistance and temperature coefficient of resistance for the particular application. In the manufacture, the mixtures of metal oxides and sulfides are formed into the desired shape and sintered under accurately controlled atmospheric and temperature conditions.

In use, thermistors are operated in either self-heated or externally heated modes. If externally heated, they convert changes in ambient or contact temperatures directly to corresponding changes in voltage or current to read extremely small differentials in temperature. This makes them unusually well-suited for precision temperature measurement, temperature control and temperature compensation and provides a degree of resolution or of gain not available with other thermal transducers such as thermocouples.

Operated in the self-heated mode, the thermistor employs the thermal heating caused by the current flow through it to raise and control its temperature and in turn its resistance. Under normal operating conditions the temperature may rise 200° to 300°C. and the resistance may be reduced to 0.001 of its value at low current. This operating mode is useful in such devices as voltage regulators, oscillator amplitude controls, microwave power meters, gas analyzers, vacuum gauges, flow meters, and automatic volume and power level controls.

The main problem with the ordinary thermistor is its temperature range limitations. It can be widely used in applications where the temperature ranges between −100°C. and 300°C. But outside this temperature range, structural damage to the material may occur and/or the material does not have thermistic properties. For example, at higher temperatures, depletion of free conductive carriers may reach the level where the material takes on the properties of an ordinary resistor. Thus, for applications involving extreme temperatures and particularly high temperatures above 300°C, other less sensitive, cumbersome and expensive types of temperature sensing devices such as thermocouples, optical thermometers, Tempilstik[R] and Tempilaq[R] must be used. Expensive diamond thermistors have been used above 300°C., but even they are limited to below about 450°C.

Also, thermistors generally are relatively low impedance devices within their operating temperature range. This property is welcomed in certain applications for very accurate temperature sensing. For example, connected in a simple bridge circuit with an indicating galvanometer, such thermistors can readily register or measure a temperature change of as little as 0.0005°C. But this property is a problem in certain other applications where very accurate temperature sensing is required. For example, where large external impedance must be introduced in the system to accomplish measurement, e.g., long lead wires, the accuracy of the thermistor as a temperature sensing device is greatly reduced.

It has been proposed to make a bulk thermistor of silicon carbide for high temperature sensing, but such thermistor has not been successful. Indeed, its properties are generally similar to the properties of metal oxide and sulfide thermistors. Its operating temperature is limited to below about 400°C. and its impedance, although somewhat erratic, is comparable to other thermistors.

Thermistors, as above described, are dependent on the changes in bulk resistance of the semiconductor material. It has been suggested that a thermistor can be made employing the voltage or current response across a PN junction in a silicon semiconductor; but the proposal is subject to the same limitations as above described for bulk-type thermistors. Indeed, the rate of depletion of free carriers is increased so that generally a junction-type silicon thermistor is limited to use below about 200°C. and its impedance within the operating temperature range is reduced.

The present invention overcomes these disadvantages and difficulties. It provides a high impedance, junction thermistor that can very accurately sense temperatures ranging from about −200°C. to above 1,400°C.

SUMMARY OF THE INVENTION

A high impedance, junction thermistor capable of accurately sensing temperatures from about −200°C. to above 1,400°C. is provided in a semiconductor body of silicon carbide. The silicon carbide body has opposed major surfaces and has at least first and second impurity regions therein of opposite conductive types with a PN junction between them. Each impurity region extends from the PN junction to one of the opposed major surfaces. Metal contacts, preferably of tungsten or doped silicon carbide, are affixed, preferably by diffusion bonding, to the major surfaces to make separate ohmic contact with said first and second impurity regions.

To connect the silicon carbide semiconductor body to an electrical circuit to form the thermistor, secondary contact means are provided that ohmically connect the metal contacts to the electrical circuit. Said secondary contact means preferably comprise a mechanical bias such as a spring or comprise a high temperature braze so that said means are capable of withstanding the temperatures to be sensed by the particular embodiment of the thermistor. Also the thermistor has encapsulation means such as a vacuum chamber for protecting at least the metal contacts from atmospheric effects, e.g., oxidation and corrosion, at the temperatures to be sensed by the particular embodiment of the thermistor. If silicon carbide contacts are used, oxidation is not a concern and in turn encapsulation may in some environments not be needed; however, generally encapsulation will still be needed to protect against moisture and other adverse affects which will cause localized resistance paths to form in the material.

In operation, the temperature is sensed by the thermistor by the impedance response across the PN junction as the silicon carbide body is subjected to the temperature to be sensed. The high impedance across the PN junction varies extensively with changes in temperature. The impedance has been found under low bias voltage (e.g., less than 3 volts) to be a logarithmically linear function of temperature between about −200°C. and about 1,000°C. In that temperature range the impedance has been found to vary from about $1 \times 10^{13}$ to $1 \times 10^{3}$ ohms. The impedance also changes extensively but non-logarithmically linear above 1,000°C., which permits thermistic responses with the aid of external processing of the output signal.

The impurity concentration gradient adjoining the PN junction may be of any suitable type, i.e., steep or shallow, symmetrical or asymmetrical. A shallow, symmetrical gradient is preferred to provide a wider carrier depletion region and in turn a logarithmically linear response over the widest possible temperature range. But for low temperature sensing and for very precise temperature measurement over a narrow temperature range, a steep, symmetrical gradient at the PN junction provides best results because of lower impedance and a higher rate of carrier depletion.

The device, which is rugged and durable, can be made in virtually any size or configuration. Its response has been found to be independent of the planar size of the PN junction. Unlike thermocouples, the output from the device is an absolute measure and does not require a reference junction. Moreover, because of its high impedance, the device can be used for accurately monitoring temperature changes at remote locations through slip rings on rotating equipment (e.g., turbines and generators), hostile environments (e.g., nuclear and biological reactors, and steelmaking furances or vessels) and other systems requiring the introduction of substantial external impedance into the system.

Other details, objects and advantages of the invention will become apparent as the following description of present preferred embodiments thereof and present preferred methods of practicing the same proceeds.

BRIEF DESCRIPTION OF THE DRAWINGS

In the accompanying drawings is shown present preferred embodiments of the invention and is illustrated present preferred methods of practicing the same in which.

BRIEF DESCRIPTION OF THE PREFERRED EMBODIMENTS

Figure 1:
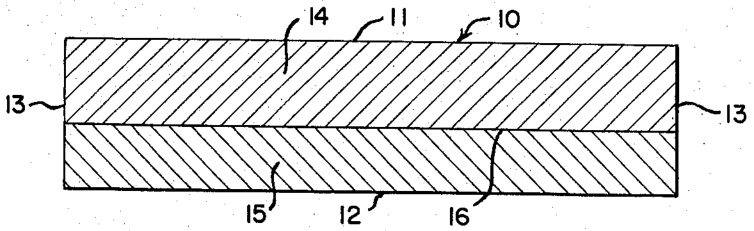
FIG. 1 is an elevation in cross-section of a silicon carbide semiconductor body suitable for use in making a thermistor.

As shown in FIG. 1, semiconductor wafer or body 10 of about 10 to 20 mils in thickness and having oppositely facing major surfaces 11 and 12 and side surfaces 13 is made of silicon carbide. N-type impurity region 14 comprised of N-type impurity adjoins major surface 11, and P-type impurity region 15 comprised of P-type impurity adjoins major surface 12. Disposed between N- and P-type impurity regions 14 and 15 is a PN junction 16.

Silicon carbide body 10 may be prepared by any of the methods known in the art, such as the sublimation or isoepitaxial techniques. The more standard crystal growth techniques, such as epitaxial growth from a melt, are not feasible because a true liquid state of silicon carbide either cannot be formed or does not exist at ordinary pressures. The preferred method for producing silicon carbide semiconductor crystal is sublimation growth from the vapor phase.

The sublimation technique involves vaporization and subsequent condensation. The silicon carbide vapor diffuses from a heated silicon carbide charge to a cooler growth cavity where the crystals are nucleated. The growth cavity is a thin-walled pervious graphite cylinder surrounded by a charge of granular silicon carbide or a mixture of granular carbon and granular silicon. The charge and growth cavity are contained in a graphite crucible. This assembly is placed in a furance and heated to about 2,500°C. by, for example, a graphite resistance heater or RF heating unit.

On heating, the silicon carbide in the charge sublimes, the vapor passes through the pervious-walled cavity, and the vapor condenses on the inner wall of the cavity forming crystal nuclei. Further growth then takes place on these nuclei. This condensation-growth process is possible since the growing crystals lose heat by radiation to the slightly cooler ends of the cylindrical cavity. The crystals grown by this technique are hexagonal platelets of 10 to 20 mils in the thickness. The size of the crystals grown by this method vary from less than 0.2 cm across to larger than 1.0 cm across. The larger crystals are grown using a denser charge of silicon carbide and longer growing cycles. Body 10 is thereafter formed by removing the hexagonal platelets from the cavity walls and cutting them with ultrasonic cutting apparatus or slicing them with a diamond wheel.

Body 10 has impurity regions 14 and 15 formed usually during, but possibly partially after, the growth of the hexagonal platelets. The body, as grown, will have either N-type or P-type impurities depending on the dominant impurity introduced into the furnace or the impurity added to the charge. Aluminum and boron are the usual P-type impurities used. Phosphorus, antimony and arsenic may be used for the N-type impurity, but typically, nitrogen is used for this purpose because of convenience.

If silicon carbide body 10 is doped during growth with an N-type impurity, P-type impurity region 15 and PN junction 16 can be subsequently formed in the body by diffusing the P-type impurity through major surface 12. This technique, however, is not preferable since body 10 must be heated usually at about 2,000°C. for about 40 to 50 hours to obtain a diffusion depth of about 4 microns. For this reason both impurity regions 14 and 15 are typically formed during sublimation growth of the silicon carbide crystal by serially adding the impurities to the growth atmosphere so that the first portion of the grown crystal is P-type or N-type and the last portion is the opposite conductive type. In this way, the PN junction 16 is formed therebetween in the interior of body 10. However, PN junction 16 may contain a relatively wide intrinsic region of relatively pure, undoped silicon carbide or a relatively wide compensated region where the impurities of opposite conductivity type balance, particularly where the transition from the addition of the first impurity to the addition of the second impurity is relatively slow. An added feature of the addition of both impurities during sublimation growth is that the impurity concentration gradients can be better controlled; the concentration gradient can be shallow or steep, symmetrical or asymmetrical, depending on the rate and/or timing of additions of the impurities to the growth atmosphere.

In any case, the resulting semiconductor body 10 has N-type impurity region 14 doped with a suitable impurity such as nitrogen typically to a concentration of from about $1 \times 10^{16}$ to $1 \times 10^{20}$ atoms/cm$^3$, and P-type impurity such as boron or aluminum typically to a concentration of from about $1 \times 10^{16}$ to $1 \times 10^{19}$ atoms/cm$^3$. For the most satisfactory results, the doping concentration of N-type region 14 should exceed the doping concentration of P-type region 15 by at least one order of magnitude.

Figure 2:
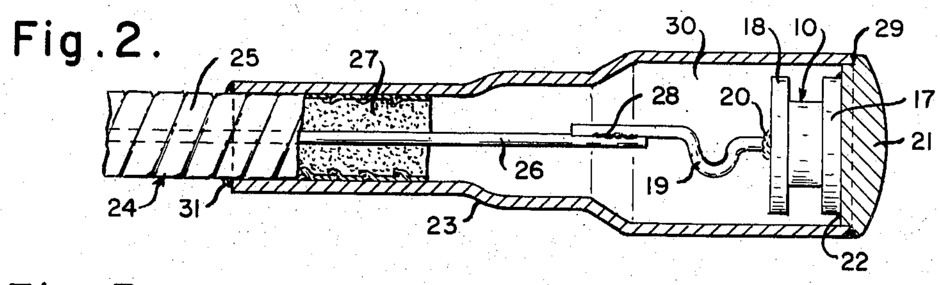
FIG. 2 is an elevation view in cross-section of a thermistor comprising the silicon carbide semiconductor body of FIG. 1.

Referring to FIG. 2, a thermistor for measuring temperatures up to about 1,000°C. is provided using the silicon carbide body 10 of FIG. 1. Contacts 17 and 18 of tungsten are affixed to major surfaces 11 and 12, respectively, to make ohmic contact to N-type and P-type impurity regions 14 and 15. Impurity regions 14 and 15 respectively may be oriented either to contacts 17 and 18 without preference. Contacts 17 and 18 are affixed to major surfaces 11 and 12 by heating the body 10, with the contacts in place, in an inert atmosphere at about 1,900°C. to form a diffusion bond of tungsten carbide (solid) and tungsten silicide (liquid phase) between the body and the contacts.

Alternatively, metal contacts 17 and 18 may be of highly doped silicon carbide (called "degenerate silicon carbide"). The composition and means for affixing such contacts to body 10 are fully described in U.S. Pat. application Ser. No. 30,481, filed Apr. 21, 1970, and assigned to the same assignee as the present application.

After affixing of contacts 17 and 18, a tungsten lead wire 19, having a bend therein to provide for thermal expansion, is fastened to contact 18 by a secondary contact 20 of gold-tantalum braze such as for example a braze consisting of 94 percent gold and 6 percent tantalum. Cap 21 of nickel alloy steel is then fastened to contact 17 by a secondary contact 22 of the same high temperature gold-tantalum braze.

The thermistor is assembled by providing housing 23 of, for example, nickel alloy steel which is slipped over flexible cable 24. The subassembly of body 10, contacts 17 and 18, lead wire 19 and cap 21, with secondary contacts 20 and 22, is then attached to high temperature flexible sheath 25 of, for example, nickel alloy steel through which a tungsten lead wire 26 is provided. Between sheath 25 and wire 26 is provided an insulation 27 such as alumina ($Al_2O_3$) or magnesia (MgO). To attach body 10 to flexible cable 24, lead wire 19 is fastened to lead wire 26 at 28 by the same high temperature gold-tantalum braze.

Thereafter, the assembly of the thermistor is finished by sliding housing 23 into position to mate with cap 21 at 29. Cap 21, housing 23 and flexible cable 24 thereby forms a chamber 30 which is in turn evacuated to provide a vacuum or an inert atmosphere, e.g., argon, therein. Housing 23 is then brazed, by high temperature braze such as gold-tantalum alloy, to cap 21 at 29 and to flexible cable 24 at 31 to completely encapsulate the body 10 and contacts 17 and 18, and in turn prevent oxidation of the contacts when the assembly is subjected to the temperatures to be sensed.

The thermistor shown is designed to operate in an externally heated mode. A bias voltage is provided across the silicon carbide body 10 and in turn PN junction 16 by forming a circuit through lead wire 24 to ground on housing 23. Preferably, for all-purpose application, the voltage is kept below about 3 volts (e.g., ±1 volt) so that the response of the thermistor is logarithmically linear over a wide temperature range of about −200°C. to 1,000°C., and so that small current and in turn negligible internal heating is encountered during operation.

Figure 3:
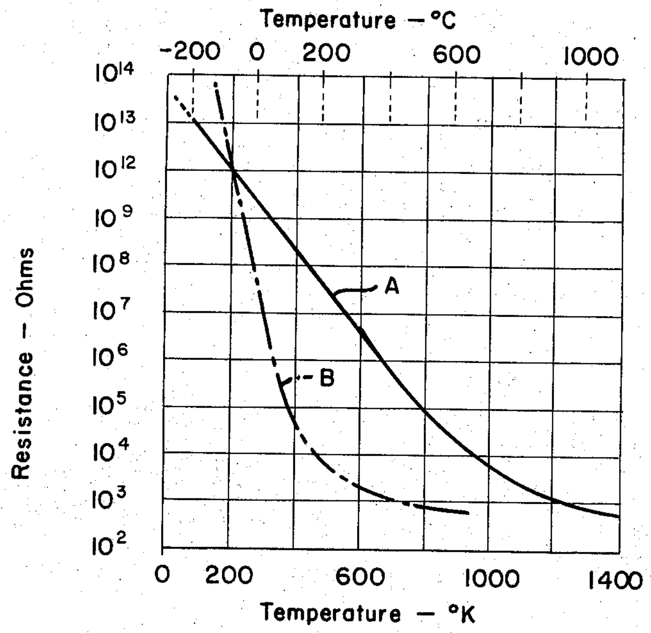
FIG. 3 is a graph showing the change in ohmic response with changes in temperature of a thermistor embodying the present invention.

FIG. 3 shows the impedance response of a thermistor similar to that shown in FIG. 2 using brazed gold-tantalum secondary contacts. The solid curve A shows the logarithmical linearity (less than a factor of 10 per 100°C.) of the impedance as a function of temperature from about −200°C. to about 1,000°C. for a bias-voltage of about 1 volt. Above 1,000°C. there is a measurable impedance response but it is not logarithmically linear because depletion of free carriers occurs causing bulk resistance to become a significant component of the impedance response. Therefore, external processing of the response signal is necessary to calibrate the signal to provide for accurate temperature measurement above about 1,000°C. Useable signal response can be had at temperatures approaching 1,100°C., the melting point of the secondary contacts 20 and 22. The dotted curve B of FIG. 3 illustrates the anticipated response for the same device with a bias-voltage of about 10 volts. This mode provides for more extensive logarithmically linear response (greater than a factor of 10 per 100°C.) over the low temperature range for more accurate reading in that range; but this mode has the disadvantage of reducing the temperature range of the logarithmically linear response because of more rapid depletion of free carriers at the high temperatures.

Figure 4:
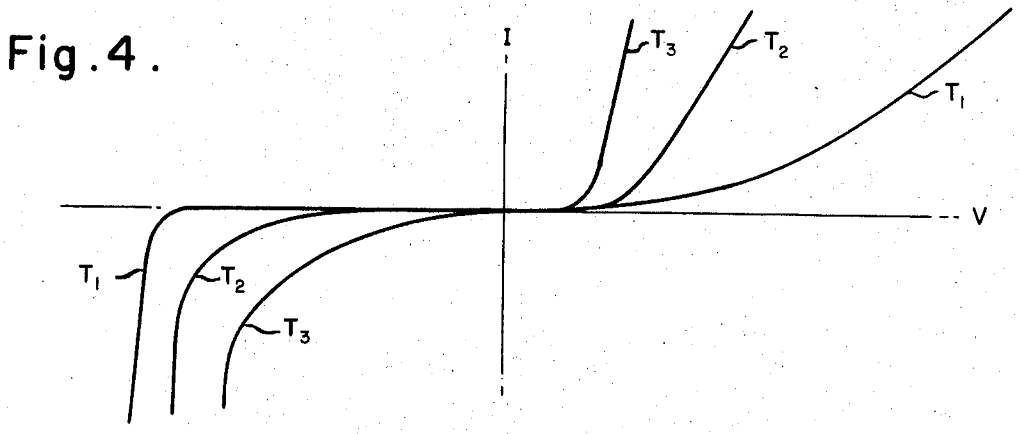
FIG. 4 is a graphic illustration of the change in current with changes in bias-voltage across a PN junction of a silicon carbide thermistor and with changes in temperature.

FIG. 4 illustrates the I–V response curves of a thermistor similar to that shown in FIG. 2 at progressively higher temperatures: $T_1$, $T_2$ and $T_3$. The response curves show that as the temperature goes up the forward response tends from a shallow to a steep slope response, and the backward breakover voltage is reduced and becomes less abrupt. For this reason, it is preferred that the thermistor be operated at low bias voltages for full scale response as above described.

To further illustrate the advantages and limitations of the invention, three additional thermistors similar to that shown in FIG. 2 were made with the secondary contacts to the tungsten contacts 17 and 18 made of different brazes. The first two devices, labeled AFD-115 and AFD-119, were brazed with silver solder having a melting point of about 600°C. The third device, labeled WAD–182, was brazed with gold-nickel eutectic alloy (82.5 percent gold and 17.5 percent nickel) having a melting point of about 850°C. The wire leads of each thermistor were serially attached to a high impedance ohmmeter (i.e., a Keithley Electrometer) to close the circuit, and each thermistor was encapsulated in a vacuum in a resistance furnace. The impedance response of the respective thermistors as a function of temperature was hereafter measured as follows:

| Temp. °C | Impedance of the Device in Ohms AFD-115 | AFD-119 | WAD-182 |
|---|---|---|---|
| 25 | $5.8 \times 10^7$ | $1.2 \times 10^{10}$ | $1.6 \times 10^9$ |
| 100 | $4.0 \times 10^6$ | $1.7 \times 10^9$ | $3.2 \times 10^8$ |
| 200 | $1.8 \times 10^5$ | $9.1 \times 10^7$ | $3.5 \times 10^7$ |
| 300 | $2.4 \times 10^4$ | $4.8 \times 10^6$ | $5.3 \times 10^6$ |
| 400 | $5.0 \times 10^3$ | $4.0 \times 10^5$ | $9.0 \times 10^5$ |
| 500 | $1.0 \times 10^3$ | $5.9 \times 10^4$ | $1.2 \times 10^5$ |
| 600 | — | — | $2.3 \times 10^4$ |
| 700 | — | — | $7.5 \times 10^3$ |
| 750 | — | — | $5.0 \times 10^3$ |

As shown by the table, each thermistor gave a logarithmically linear impedance response over its operative temperature range. However, the operative range was limited to below the melting point of the secondary contacts to the tungsten contacts 17 and 18.

The thermistor of the present invention also has utility in applications other than temperature measurements. FIG. 4 illustrates that there is distinct changes in the I–V curve for changes intemperature. Thus, the thermal heat caused by the current flow through it can be used to raise and control its temperature and in turn its resistance. It can, therefore, be used in high temperature applications in the self-heated mode. Moreover, the change in the I–V curve with temperature also demonstrates that the thermistor also has the ability, where biased with a large forward voltage, to switch high power with changes in temperature.

Figure 5:
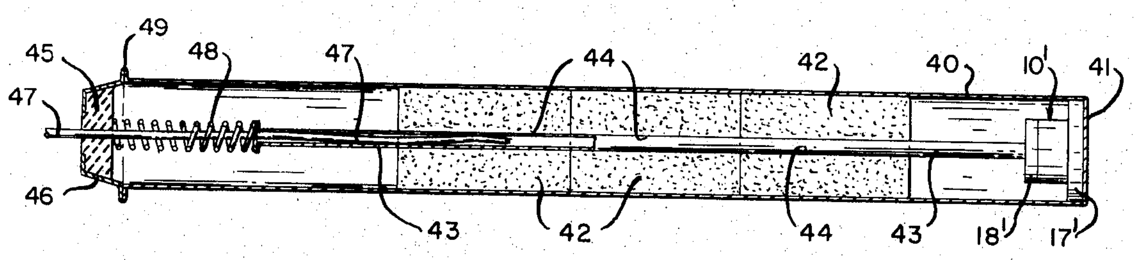
FIG. 5 is an elevation view in cross-section of an alternative thermistor comprising the silicon carbide semiconductor body of FIG. 1.

Referring to FIG. 5, an alternative embodiment of the thermistor of the present invention is shown. Body 10' corresponding to the silicon carbide semiconductor body shown in FIG. 1 has tungsten metal contacts 17' and 18' diffusion bonded to it as above described.

Cylindrical housing 40 of nickel alloy steel is provided with a rigid integral end cap 41. The body 10' with contacts 17' and 18' is slid into the open end of housing 40. The outside diameter of contact 17' and the inside diameter of housing 40 are of close tolerances to provide for the positioning of body 10' within the housing 40. The outside diameter of contact 18' is smaller in dimension than the inside diameter of cylindrical housing 40 so that it does not contact the housing 40 and short-circuit the thermistor.

Insulation sections 42 of alumina are thereafter inserted through the open end of housing 40 and positioned in housing 40. Tubular contact 43 of tungsten is then inserted through the open end of housing 40 and positioned in the openings 44 in insulation sections 42 with its end portion in physical contact with metal contact 18'.

Ceramic cap 45 is provided with rigid periphery flange 46 of nickel alloy steel. And contact lead 47 is rigidly fastened through ceramic cap 45. Over contact lead 47 is positioned spring 48. This assembly is then positioned over the open end of cylindrical housing 40 to mechanically bias tubular contact 43 against contact 18' and provide ohmic electrical contact between lead 47 and tubular contact 43. The cylindrical housing 40 is then evacuated to form a vacuum or an inert atmosphere, e.g., argon, therein, and the periphery flange 46 brazed over the open end of cylindrical housing 40 at 49 with a high temperature braze such as gold-tantalum alloy.

This thermistor has the advantage of having the secondary contacts formed by mechanically bias means and not material having a relatively low melting point. The upper limits of its operating temperature is therefore not the melting point of the secondary contact means. For this reason, it is anticipated (although it has not been measured) that useable thermistic responses can be had at temperatures above 1,400°C. and even possibly approaching 1,900°C., the melting point of tungsten contacts 17' and 18'.

While the presently preferred embodiments of the invention have been specifically described, it is distinctly understood that the invention may be otherwise variously embodied and used within the scope of the following claims.

What is claimed is:

1. A high impedance, junction thermistor comprising:

a. a silicon carbide semiconductor body having opposed major surfaces and having at least first and second impurity regions of opposite conductive type with a PN junction therebetween, each said impurity region extending from said PN junction to one of the major surfaces;

b. electrical contacts affixed to each major surface making ohmic contact to the impurity region extending to said major surface;

c. secondary electrical contact means comprising mechanical bias means for ohmically connecting said contacts to an electrical circuit, said secondary contact means capable of withstanding the temperature to be sensed by the thermistor; and d. means for protecting said contacts and secondary contact means adjacent said contacts from oxidation at the temperatures to be sensed by thermistor.

2. A high impedance, junction thermistor as set forth in claim 1 wherein said electrical contacts are tungsten.

* * * * *